US012005470B2

(12) United States Patent
Hofer et al.

(10) Patent No.: US 12,005,470 B2
(45) Date of Patent: Jun. 11, 2024

(54) DOUBLE-ACTING PISTON PUMP OF APPLICATION SYSTEM

(71) Applicant: Robatech AG, Muri (CH)

(72) Inventors: Andreas Hofer, Umiken (CH); Hanspeter Felix, Zofingen (CH)

(73) Assignee: Robatech AG, Muri (CH)

( * ) Notice: Subject to any disclaimer, the term of this patent is extended or adjusted under 35 U.S.C. 154(b) by 0 days.

(21) Appl. No.: 18/231,123

(22) Filed: Aug. 7, 2023

(65) Prior Publication Data

US 2023/0372963 A1 Nov. 23, 2023

Related U.S. Application Data

(62) Division of application No. 17/244,879, filed on Apr. 29, 2021, now Pat. No. 11,766,693.

(30) Foreign Application Priority Data

Apr. 30, 2020 (EP) .................................... 20172294

(51) Int. Cl.
*B05C 11/10* (2006.01)
*B05C 5/02* (2006.01)
(Continued)

(52) U.S. Cl.
CPC ............ *B05C 11/1002* (2013.01); *B05C 5/02* (2013.01); *F04B 9/133* (2013.01); *F04B 49/065* (2013.01);
(Continued)

(58) Field of Classification Search
CPC ....... B05C 11/1002; B05C 5/02; F04B 9/133; F04B 2201/0201
See application file for complete search history.

(56) References Cited

U.S. PATENT DOCUMENTS 4,286,929 A * 9/1981 Heath ..................... F04B 9/133 417/404
4,383,418 A * 5/1983 Holzer .................... F25B 27/00 62/235.1
(Continued)

FOREIGN PATENT DOCUMENTS

DE 20 2019 000 576 U1 4/2019
EP 2 107 241 A2 10/2009
(Continued)

OTHER PUBLICATIONS

Europäisches Patentamt (European Patent Office), Europäischer Recherchenbericht (European Research Report), Sep. 8, 2020, 2 pages, European Patent Office, München, Germany (DE).

*Primary Examiner* — Jeremy Carroll
(74) *Attorney, Agent, or Firm* — CHRISTOPHER C. DREMANN, P.C.; Christopher C. Dremann

(57) ABSTRACT

A double-action piston pump of an application system for applying a fluid medium to a substrate, wherein the piston pump has a piston which is movable between a first reversal point and a second reversal point for delivering the fluid medium, wherein on reaching the first reversal point and the second reversal point, the movement direction of the piston is reversed, wherein during an output period, the fluid medium is output by means of an output device, and during an interruption period, an output of the fluid medium by means of the output device is interrupted, wherein during the interruption period, the movement direction of the piston is reversed, wherein on reversal of the movement direction during the interruption period, the piston is situated at an intermediate position between the first reversal point and the second reversal point.

9 Claims, 3 Drawing Sheets

(51) Int. Cl.
*F04B 9/133* (2006.01)
*F04B 49/06* (2006.01)

(52) U.S. Cl.
CPC ................. *F04B 2201/0201* (2013.01); *F04B 2201/0202* (2013.01)

(56) References Cited

U.S. PATENT DOCUMENTS

| | | | | |
|---|---|---|---|---|
| 5,423,662 | A * | 6/1995 | Hetherington | F04B 13/02 417/530 |
| 8,398,379 | B2 * | 3/2013 | Yajima | F04B 43/107 417/385 |
| 2006/0159565 | A1 * | 7/2006 | Sanwald | F04B 9/133 417/395 |
| 2014/0138399 | A1 | 5/2014 | Estelle | |
| 2016/0008834 | A1 | 1/2016 | Brudevold et al. | |
| 2016/0097385 | A1 | 4/2016 | Estelle | |
| 2018/0185872 | A1 | 7/2018 | Duckworth et al. | |
| 2018/0361415 | A1 | 12/2018 | Brudevold et al. | |

FOREIGN PATENT DOCUMENTS

| | | | |
|---|---|---|---|
| EP | 2 732 884 | A2 | 5/2014 |
| ES | 2 064 183 | A2 | 1/1995 |
| WO | 2017044685 | A1 | 3/2017 |

* cited by examiner

DOUBLE-ACTING PISTON PUMP OF APPLICATION SYSTEM

FIELD OF THE INVENTION

The invention concerns a method for operating a double-action, preferably pneumatically driven or driveable piston pump of an application system for applying a fluid medium, in particular a heated adhesive, to a substrate, wherein the piston pump has a piston which is movable between a first reversal point and a second reversal point for delivering the fluid medium. The movement direction of the piston is reversed on reaching the respective reversal point. The application system has an output device for intermittent output of the fluid medium output by means of the output device. The invention furthermore concerns a double-action piston pump for delivering a fluid medium to an output device. The invention furthermore concerns an application system for application of a fluid medium to a substrate.

BACKGROUND OF THE INVENTION AND RELATED ART

A piston pump for delivering a fluid medium is known for example from EP 2 732 884 A2.

In the field of the application of fluid media, in particular the field of application of adhesive, there is a desire to obtain as precise an application pattern as possible. To this extent, in particular there is interest in minimizing the influences of an adhesive delivering device, for example a double-action piston pump, on the application pattern. When double-action piston pumps are used, in particular double-action pneumatically driven piston pumps, the problem arises that at the reversal points, on reaching which the movement direction of the piston is reversed, a pressure fall occurs in the fluid medium delivered by means of the piston pump. This pressure fall and its temporal development are in particular dependent on the viscosity and flow properties of the fluid medium, for example the delivered heated adhesive. Furthermore, the pressure fall and its temporal development are greatly dependent on the design and configuration of some components of the piston pump. For example, the travel direction of a pneumatically driveable piston pump with a pneumatic piston is reversed via an electrically actuated pneumatic changeover valve. The changeover process of this valve takes some time. Also, during changeover, it takes time to dissipate the air pressure present on the one side of the pneumatic piston and build up the air pressure on the other side of the pneumatic piston. Frequently, with double-action piston pumps, two check valves are provided which usually have different designs. The two check valves are usually designed in the form of movable balls which, with a vertical operating direction of the piston, seal alternately at the top and bottom against a flow of the fluid medium to be delivered. During the changeover process, the ball of the one check valve moves from a sealing position to a passage position, and the ball of the other check valve moves from a passage position to a sealing position, and vice versa. This movement of the balls also takes some time. During the reversal process, at the first reversal point and the second reversal point of the piston, i.e. during actuation of the check valves, a slight loss of volume flow of the fluid medium occurs. This loss or pressure fall is typically of different amount at the two reversal points.

With a double-action piston pump, the problem arises that on reversal of the movement direction of the piston, the pressure of the delivered fluid medium falls for a limited time, or a certain time is required until the pressure of the fluid medium again assumes an approximately constant value. The pressure fall at the reversal points has a negative effect on the quality of the fluid medium applied to the substrate or on the application pattern. On continuous application of the fluid medium to the substrate by means of the output device, a reversal of the movement direction of the piston and an associated pressure fall leads to a temporally limited reduction in the output of fluid medium. Accordingly, in an application system with a double-action piston pump, at the reversal points of the piston pump, a reduced output of fluid medium occurs which has a negative effect on the application pattern. For example, with a continuous output of the fluid medium in the form of a strip, also known as an application bead or bead, clear constrictions occur in the cross-section of the applied bead which correlate temporally with the reversal points of the movement direction of the piston of the adhesive pump. The so-called application pattern then shows clear, regular constrictions.

Various possibilities for preventing or reducing the pressure fall on reversal of the movement direction of the piston of the piston pump, or for minimizing the effects of this pressure fall on the application pattern, are known in the prior art.

For example, EP 2 107 241 A2 to this end proposes a piston pump, wherein the piston pump has at least two piston-cylinder units for delivering the fluid medium. The two pumps are operated such that a pressure fall in the delivery of fluid by the one pump is compensated by the respective other pump. Furthermore, in the prior art of ES 2 064 183 A2, the use of a pressure accumulator is known, wherein the pressure accumulator largely compensates for the fall in pressure on reversal of the movement direction of the piston of the piston pump. The disadvantage of this solution is that a pressure accumulator can only be designed optimally for a single operating state. The compensation for the falling pressure is satisfactory only for a specific pressure setting and only for a specific viscosity of fluid medium. The greater the deviation from the optimal operating point, the poorer the compensation for the pressure fall by the pressure accumulator.

OBJECTS AND SUMMARY OF THE INVENTION

It is an object of the present invention to provide a method for operating a double-action piston pump of an application system for applying a fluid medium, in particular a heated adhesive, to a substrate so that effects of the pressure fall during reversal of the movement direction on the application pattern are avoided or at least reduced, in particular constrictions of an application bead are avoided or at least reduced. Furthermore, it is an object of the present invention to specify a double-action piston pump for delivering a fluid medium to an output device, with which constrictions in the application of the fluid medium can be avoided. It is furthermore an object of the present invention to indicate an application system for applying a fluid medium, which allows constrictions in the application of the fluid medium to be avoided or at least reduced.

These objects and others are achieved by a method according to the invention, a double-action piston pump according to the invention, and an application system according to the invention, as described herein and shown in the accompanying drawing figures.

The method according to the invention is a method for operating a double-action piston pump of an application system for applying a fluid medium. The fluid medium is in particular a heated adhesive and/or a viscous melt adhesive. The piston pump is a double-action piston pump, i.e. a piston pump which delivers the fluid medium in both stroke directions of the piston. The application system serves for applying the fluid medium to a substrate, wherein the substrate may for example be a paper sheet, a cardboard or a film. A substrate may in fact consist of a plurality of separate structures, for example the substrate may be a plurality of strip-like elements, e.g. paper strips, cardboard strips or film strips, which are arranged spaced apart from one another and pass successively by an application head which serves for output of the medium.

The piston pump has a piston which is movable between a first reversal point and a second reversal point for delivering the fluid medium, wherein on reaching the respective reversal point, the movement direction of the piston is reversed. The application system furthermore has an output device, for example one or more spray heads, for intermittent output of the fluid medium delivered by means of the piston pump to the output device. In the method according to the invention, it is provided that during output periods, the fluid medium is output by means of the output device and during interruption periods, an output of the fluid medium by means of the output device is interrupted. In the method according to the invention, it is provided that during at least one interruption period of the interruption periods, the movement direction of the piston is reversed, wherein on the reversal of movement direction during the at least one interruption period, the piston is situated at an intermediate position between the first reversal point and the second reversal point.

Since a reversal of the movement direction of the piston takes place during at least one interruption period of the interruption periods, at least this reversal of the movement direction takes place during a period in which the reversal of the movement direction of the piston and the associated pressure fall have no effect or only a slight effect on the application pattern of the fluid medium on the substrate, since during the interruption period there is no output of fluid medium by the output device. In particular, the movement direction of the piston is reversed during the at least one interruption period of the interruption periods such that the time until the output period following the at least one interruption period is sufficient for the pressure to be built up to a nominal value again before the start of the subsequent output period, insofar as the reversal-induced, temporally limited pressure fall has ended before the start of the subsequent output period.

In conventional piston pumps or methods for operating a piston pump, the movement direction of the piston is reversed exclusively when reaching the respective reversal point. Thus with such a method or piston pump, there is no temporal coordination of the reversal of the movement direction of the piston with the interruption period or interruption periods. In contrast, with the solution according to the invention, a direction change of the movement of the piston of the piston pump during the at least one interruption period of the interruption periods takes place at an intermediate position, i.e. before reaching the reversal point lying in the movement direction.

It is quite conceivable that the reversal of the movement direction of the piston of the piston pump during an interruption period of the interruption periods takes place at an intermediate position between the two reversal points, and the reversal of the movement direction of the piston of the piston pump during another interruption period of the interruption periods takes place at another intermediate position between the two reversal points.

It is quite conceivable that in the method, the piston also reaches the first and/or second reversal point.

It is also quite conceivable that the piston effectively reaches the first reversal point or second reversal point during one or more other interruption periods, so there is no temporally advanced reversal of the movement direction of the piston at an intermediate position.

Preferably, the intermittent output of the fluid medium takes place such that with the intermittent output, a temporally recurrent pattern of output fluid medium results, in particular if a plurality of similar substrates are provided with the fluid medium.

Preferably, the piston pump has a delivery region and a drive region. The piston is arranged in the delivery region and serves for delivering the fluid medium. The components serving to drive the movement of the piston are arranged at least partially, preferably completely in the drive region.

Preferably, the piston pump is a pneumatically driveable piston pump. The piston pump preferably has a pneumatic piston which is actively connected to the piston serving for delivering the fluid medium, and serves to drive the movement of the piston. Preferably, for the stroke movement of the piston in the direction of the first reversal point or second reversal point, a corresponding side of the pneumatic piston is loaded with compressed air and the other side purged. The movement direction of the piston is preferably reversed via an electrically or pneumatically actuatable pneumatic changeover valve.

In particular, the piston pump has a pneumatic part, also known as a pneumatic region, and a delivery region, wherein the pneumatic piston is arranged in the pneumatic part and the piston serving to convey the fluid medium is arranged in the delivery region.

Drive systems other than a pneumatic drive are also conceivable which achieve a reciprocating motion of the piston. For example, a hydraulic drive, in particular with a hydraulic piston, or an electric drive, in particular in the manner of a linear motor.

Preferably, the first reversal point and the second reversal point are not structured variably, so that the first reversal point and the second reversal point are fixed in operation of the double-action piston pump. Preferably, the two reversal points are unchanging, in particular structurally imposed.

Preferably, the first reversal point and the second reversal point are the bottom and top dead centers of the piston.

It is considered particularly advantageous if the reversal of the movement direction of the piston takes place exclusively or at least mainly during the interruption periods. In this way, the negative influences of the respective reversal of the movement direction on the application pattern are particularly slight. However, the movement direction of the piston is not necessarily reversed during each interruption period.

It is considered particularly advantageous if an output quantity of the fluid medium which is output by means of the output device during the respective output period, is smaller than a delivery quantity of the medium which is delivered to the output device by means of the piston pump on a piston travel of the piston pump from the first reversal point to the second reversal point and/or vice versa. With such an embodiment, the fluid medium may be output during the output periods without a reversal of the movement direction of the piston. This has a particularly advantageous effect on the quality of application of the fluid medium to the substrate.

For the case that an output quantity of the fluid medium which is output by means of the output device during an output period of the output periods, is greater than a quantity of medium which is delivered to the output device on a complete stroke length of the piston pump or when reaching one of the reversal points during an output period of the output periods, it is quite conceivable to compensate for the pressure fall on reversal of the movement direction of the piston of the piston pump. To this end, it is conceivable to activate a pressure accumulator in a controlled fashion so as to compensate for the pressure fall on the changeover process. The pressure accumulator may be a spring accumulator or a pressure accumulator working on the principle of a single-action, pneumatically actuated piston pump.

During operation of the piston pump, preferably a number of reversals of the movement direction which take place at intermediate positions of the piston between the first reversal point and the second reversal point, is greater than a number of reversals of the movement direction which take place at the reversal points. Thus, reversals of the movement direction mainly take place at intermediate positions of the piston between the first reversal point and the second reversal point.

It is quite conceivable that, during operation, a reversal of the movement direction takes place exclusively at intermediate positions insofar as the reversal points are not reached. The reversal points would then only be reached if, for example because of a malfunction of the pump in execution of the method or of the control system for performance of the method, the movement direction is undesirably not reversed at the intermediate position. Since then a reversal of the movement direction, with respect to a movement of the piston in the direction of one of the reversal points, takes place at the latest on reaching this reversal point, damage to components of the piston pump is avoided.

It is considered particularly advantageous if, during the interruption periods, a piston speed—wherein a piston speed means the amount of piston speed—of the piston is reduced in comparison with a piston speed during the output periods, in particular the piston speed during the interruption periods is equal to zero. Accordingly, the temporal development of the piston speed correlates with the output periods and the interruption periods. Accordingly, via detection of the piston speed, it can be determined whether an output period or an interruption period is present. Accordingly, it is not necessary to provide a superior control system which detects whether the output device is delivering medium or whether the output is interrupted, but reversal of the movement direction can take place separately from the superior control system or knowledge of the operating state of the output device (output or interruption output) purely from the measured piston speed, so that the piston pump can be operated quasi-autonomously and no superior control system is required. Since the piston speed correlates with the output periods and interruption periods, a reversal of the movement direction of the piston may be dependent on the piston speed, and a reversal of the movement direction during the at least one interruption period may take place from knowledge of the piston speed.

In the case of a recurrent application pattern, the recurrent application pattern may be detected by measuring the piston speed. In this way, at the start of an interruption period, the expected travel length of the piston until the start of the next interruption period can be determined. Alternatively, it is conceivable that the programmed or predefined application pattern of a superior application control system is used in order to determine the temporal development of the interruption periods for determining the piston positions to be expected with respect to the interruption periods. In this way, the operating reliability of the invention may be improved since unexpected changes in the application pattern can be taken into account.

It is considered particularly advantageous if the piston pump has leakages with respect to the fluid medium to be delivered, so that during the interruption periods, a piston speed of the piston is reduced in comparison with a piston speed during the output periods. A piston pump with leakages is also considered advantageous with respect to minimizing wear, avoiding maintenance work and achieving a longest possible service life of the piston pump. It is considered particularly advantageous if the leakage occurs between the piston and cylinder. This leakage is dependent above all on the viscosity and flow behavior of the fluid medium, on a size of a gap around the piston and on the pressure built up by the piston pump. In a piston pump with leakage, during the interruption periods, a piston speed of the piston is reduced in comparison with a piston speed during the output periods, since during the interruption periods, the resistance to the piston movement is higher in comparison with a resistance to the piston movement on output of the fluid medium.

Preferably, the piston of the piston pump is not designed to seal with respect to a cylinder, and/or the piston pump has a piston rod which is not designed to seal with respect to a guide.

Preferably, the piston pump has two check valves, wherein depending on the movement direction of the piston, the one check valve is open and the other check valve is closed. The two check valves usually take the form of movable balls which, with a vertical operating direction of the piston, seal alternately at the top and bottom against a flow of the fluid medium to be delivered. On the changeover process, the ball of the one check valve moves from a sealing position to a passage position, and the ball of the other check valve moves from a passage position to a sealing position, and vice versa on the following changeover process.

In a preferred embodiment of the method, the piston speed is measured and the movement direction of the piston is reversed outside the reversal points if the piston speed is less than or equal to a specific value, wherein in particular, the specific value corresponds to the piston speed of the piston during the interruption periods. The above-mentioned condition, namely that the piston speed is less than or equal to a specific value, may be considered an essential condition but not necessarily a sufficient condition for the reversal of the movement direction of the piston. It is however quite conceivable that this is a sufficient condition for the reversal of the movement direction of the piston.

In an advantageous refinement of the method, it is provided that a distance of the piston from the reversal point lying in the movement direction of the piston is determined, wherein the reversal of the movement direction of the piston during the respective interruption period takes place before reaching the reversal point lying in the movement direction of the piston, if the distance of the piston from the reversal point lying in the movement direction of the piston is less than a specific value, and/or wherein a distance of the piston from the reversal point lying opposite the movement direction of the piston is determined, wherein a reversal of the movement direction of the piston during the respective interruption period takes place before reaching the reversal point lying in the movement direction of the piston, if the distance of the piston from the reversal point lying opposite the movement direction of the piston exceeds a specific value.

It is quite conceivable that the piston position is permanently measured.

The distance of the piston from the respective reversal point, used for comparison with the specific value, is preferably determined at the start of the respective interruption period.

The specific value with respect to the reversal point lying in the movement direction of the piston preferably corresponds to an expected stroke of the piston in the movement direction of the piston until the start of the next interruption period.

The specific value with respect to the reversal point lying opposite the movement direction of the piston preferably corresponds to an expected stroke of the piston against the movement direction of the piston until the start of the next interruption period.

It is considered particularly advantageous if the piston speed is measured and a distance of the piston from the reversal point lying in the movement direction of the piston is determined, wherein the movement direction of the piston is reversed if the piston speed is less than a specific value and the distance of the piston from the reversal point lying in the movement direction of the piston is less than a specific value, and/or if the piston speed is measured and a distance of the piston from the reversal point lying opposite the movement direction of the piston is determined, wherein the movement direction of the movable piston is reversed if the piston speed is less than a specific value and the distance of the piston from the reversal point lying opposite the movement direction of the piston exceeds a specific value.

The advantage of the above-mentioned embodiment of the method is that the piston speed is a criterion for whether an interruption period is present. Since the movement direction of the piston should be reversed during an interruption period, a reversal of the movement direction of the piston should take place only during a period with reduced piston speed. Therefore the reduced piston speed is a first criterion for changeover. The distance of the piston from the respective reversal point is used as a further criterion to decide whether the movement direction should be reversed. The context here is that, if the distance of the piston from the reversal point lying opposite the movement direction of the piston is too small, there is a danger that, on a reversal of the movement direction of the piston, the piston will reach this reversal point during the subsequent output period; consequently, a reversal of the movement direction will take place in this output period and accordingly a pressure fall will occur during output of the medium, with the corresponding negative effects on the output pattern.

It is quite conceivable that the piston position for determining the distance value of the piston from the respective reversal point, or the distance value of the piston from the respective reversal point, is determined if the piston speed is less than a specific value. To this extent, it is firstly checked whether the first criterion is fulfilled, namely the piston speed is less than a specific speed value. Only on the presence of the first criterion is the second criterion checked, namely the distance. This reduces the measurement and analysis complexity.

It is considered particularly advantageous if the piston pump comprises sensors for measuring a piston position and/or a distance of the piston from the first reversal point or the second reversal point, and/or for measuring the movement direction of the piston and/or for measuring the speed of the piston. It is considered particularly advantageous if the sensor is configured as a Hall sensor. In connection with a Hall sensor, it is considered particularly advantageous if the piston pump has a magnet, preferably a ring magnet, wherein the magnet is movable together with the piston. It is quite conceivable that the piston pump comprises several Hall sensors, preferably at least four Hall sensors, in particular precisely four Hall sensors.

The term "distance" in the above connections should be interpreted broadly. Thus it is for example conceivable that the travel length of the piston from the one reversal point to the other reversal point is divided into at least two portions, wherein then the term "distance" refers to the portion in which the piston is present. For example, the travel length may be divided into a first portion and a second portion, wherein the first portion contains the first reversal point and the second portion contains the second reversal point. The distance criterion or distance may then refer to the portion in which the piston is present. Thus the distance of the piston from the first reversal point is smaller if the piston is in the first portion then if the piston is in the second portion. Knowledge of the portion in which the piston is present may therefore be used as a criterion for whether or not a distance value has been reached or exceeded.

In principle, it is conceivable that, in an application system with two double-action piston pumps, in a similar fashion, the reversal of the movement direction of the piston of the respective piston pump is controlled such that the movement directions of the pistons of both piston pumps are not reversed simultaneously, but the movement direction of the piston of the one piston pump is changed prematurely if it is foreseeable that a reversal of the movement direction of the one piston pump at the first or second reversal point would coincide with a reversal of the movement direction of the piston of the other pump at the first reversal point or second reversal point.

The double-action piston pump according to the invention serves for delivering a fluid medium to an output device. In particular, the double-action piston pump serves for delivering a heated adhesive, in particular a viscous melt adhesive, to an output device. The output device may in particular be a spray head. The piston pump has a piston which is movable between a first reversal point and a second reversal point for delivering the fluid medium. Furthermore, the piston pump has a control device for controlling the movement direction of the piston, wherein the control device is configured to reverse the movement direction of the piston on reaching the respective reversal point. Furthermore, the piston pump has a measuring device for measuring a piston speed, wherein the control device is configured to reverse the movement direction of the piston if the measured piston speed is less than a specific speed value.

Since the speed of the piston is usually dependent on whether or not the output device is delivering a fluid medium, the piston speed is a measure of whether the output device is delivering a fluid medium or the output of fluid medium by means of the output device has been interrupted. The double-action piston pump is thus suitable for executing the method according to the invention with the corresponding advantages.

It is considered particularly advantageous if the piston pump has leakages with respect to the fluid medium to be delivered. In this context, it is considered particularly advantageous if the piston is not designed to seal with respect to a cylinder, and/or the piston pump has a piston rod which is not sealed with respect to a guide. A piston pump with leakages firstly has the advantage that wear on the piston pump is reduced, and also with respect to the method, has the advantage that the speed of the piston during the interruption period is reduced in comparison with the speed of the piston during the output periods.

Preferably, the piston pump has two check valves, wherein depending on the movement direction of the piston, the one check valve is open and the other check valve is closed, in particular the check valves differ in design. The two check valves are assigned to the part of the piston pump in which the fluid medium is delivered, i.e. the delivery region.

The double-action piston pump is preferably configured as a pneumatically driveable piston pump. In particular, the piston pump has a pneumatic part, also known as a pneumatic region, and a delivery region, wherein the pneumatic piston is arranged in the pneumatic part and the piston which serves for delivering the fluid medium is arranged in the delivery region.

Preferably, the piston pump has a measuring device for measuring a distance of the piston position of the piston from the reversal point lying in the movement direction of the piston, wherein the control device is configured to reverse the movement direction of the piston if the measured piston speed is less than a specific speed value and the measured distance is less than a specific distance value, or the piston pump has a measuring device for measuring a distance of the piston position of the piston from the reversal point lying opposite the movement direction of the piston, wherein the control device is configured to reverse the movement direction of the piston if the measured piston speed is less than a specific speed value and the measured distance exceeds a specific distance value.

Preferably, the piston pump has a magnet or several magnets, preferably one or more ring magnets, wherein the magnet is movable together with the piston or the magnets are movable together with the piston, wherein the measuring device for measuring the piston speed comprises at least one Hall sensor and/or the measuring device for measuring the distance comprises at least one Hall sensor. Preferably, the piston pump has at least three Hall sensors, in particular at least four Hall sensors. Preferably, the piston pump with several Hall sensors also comprises several magnets. In particular, a magnet is assigned to each Hall sensor. Preferably, the control device has an evaluation device for evaluating the magnetic flux density measured by means of the one or more Hall sensors, wherein the evaluation device is in particular configured to determine the first and second derivative of the measured magnetic flux density. From the measured magnetic flux density, the first derivative of the flux density and the second derivative of the flux density, conclusions can be drawn about the piston position, the piston speed and the piston acceleration.

Preferably, the piston pump comprises at least two Hall sensors, wherein a travel length of the piston from the one reversal point to the other reversal point with respect to measurement of the piston speed and/or measurement of the piston position is divided into at least two portions, wherein one of the at least two sensors can be assigned to each portion. In particular, the division of the travel length and the assignment of the Hall sensors is such that, for the Hall sensor which can be assigned to the respective portion, an almost linear correlation exists between the magnetic flux density detected by this Hall sensor and the piston position of the piston when the piston is in the portion assigned to this Hall sensor.

With respect to measuring the piston position and/or piston speed based on the magnetic flux density by the Hall sensors, it is considered advantageous to carry out a calibration process, in particular to compensate for production tolerances of the individual components. It is possible to carry out this calibration process automatically on commissioning of the piston pump. For this, the pump may be moved at low speed for several cycles without adhesive. The reference values of the flux densities may thus be learned.

The calibration process furthermore allows the polarity of the magnet to be established during the calibration process. The reference values may be adapted automatically, in particular a digital electronic unit may be programmed for evaluation of the Hall sensors according to the installation position of the magnet. Thus on installation, it is not necessary to maintain a specific orientation of the magnet. Dismantling in order to correct an incorrect installation position of the magnet is thus not necessary.

By determining the speed and/or an acceleration of the piston, it is possible to measure an oscillation behavior or a vibration of the piston. This oscillation behavior may serve as an indication for wear and possible early failure of components of the piston pump. Thus preventative maintenance or replacement of components may take place. Thus a production downtime cost for the customer can be avoided.

It is considered particularly advantageous if the piston pump is configured as a pneumatically driveable piston pump with a pneumatic piston actively connected to the piston, wherein the control device has an actuatable valve or actuatable valve arrangement, wherein on actuation of the valve or valve arrangement, a direction of pressurization of a pneumatic piston changes. Thus the movement direction of the piston can be reversed in simple fashion by actuating the valve or valve arrangement.

The application system according to the invention for applying a fluid medium, in particular a heated adhesive, to a substrate has a double-action piston pump as described hereinabove and an output device for intermittent output of the fluid medium which is delivered to the output device by means of the double-action piston pump.

BRIEF DESCRIPTION OF THE DRAWING FIGURES

In the figures which follow, the invention is explained in more detail with reference to one or more exemplary embodiments, without being restricted thereto.

DETAILED DESCRIPTION OF EXEMPLARY EMBODIMENTS OF THE INVENTION

Figure 1:
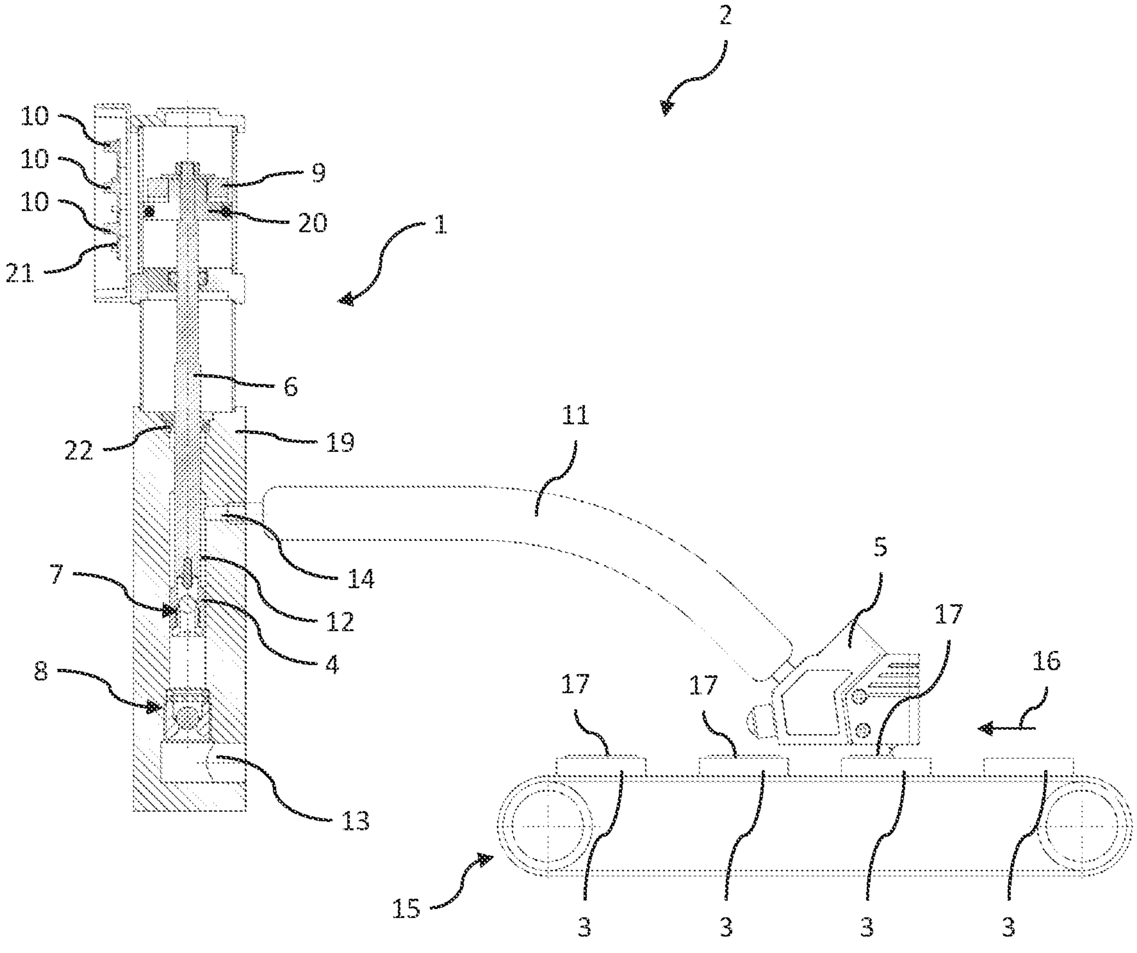
FIG. 1 shows an application system for applying a fluid medium, having a double-action piston pump and an output device.
Figure 2:
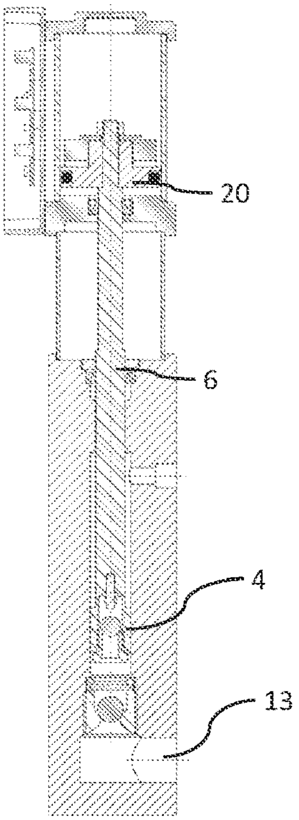
FIG. 2 shows the piston pump from FIG. 1 with a piston at a first reversal point.
Figure 3:
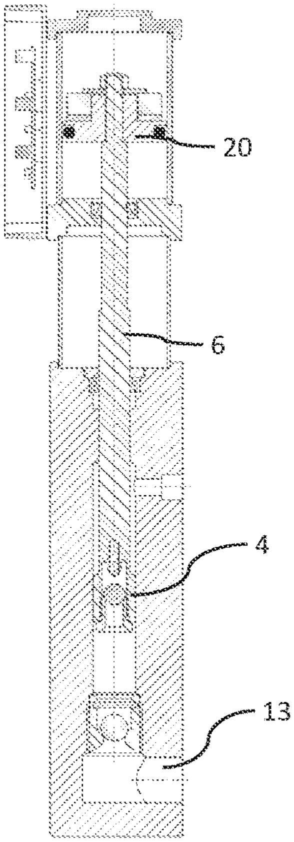
FIG. 3 shows the piston pump from FIG. 1 with the piston at an intermediate position.
Figure 4:
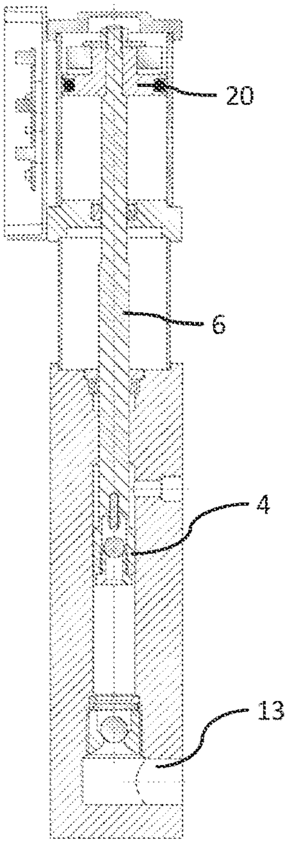
FIG. 4 shows the piston pump from FIG. 1 with the piston at a second reversal point.

FIG. 1 shows an application system 2 for application of a fluid medium, in the present case a heated adhesive, to a substrate 3. The substrate 3 may for example be a paper sheet or cardboard sheet. The application system 2 has a double-action piston pump 1. Since this is a double-action piston pump 1, the piston pump 1 is active in both stroke directions of the piston 4. By means of the piston pump 1, the fluid medium is delivered from a storage device (not shown), which can be connected to the piston pump 1, to an output device 5. The output device 5 is fluidically connected to the piston pump 1, namely to a cylinder bore 12 of the piston pump, by means of a heating hose 11. During operation of the piston pump, the adhesive is conducted from the storage container to an intake chamber 13 for adhesive. From there, the adhesive is drawn into the cylinder bore 12 and delivered to the output device 5 under pressure via a pressure port 14 which is connected to the heating hose 11.

In the present case, the output device 5 is suitable for intermittent output of the adhesive delivered to the output device 5, so that during output periods, adhesive is output by means of the output device 5, and during interruption periods, an output of the adhesive by means of the output device 5 is interrupted. This is advantageous for example if, as shown schematically in FIG. 1, the adhesive is to be applied to substrates 3 which are arranged spaced apart from one another on a conveyor belt 15 and moved, in particular continuously, by means of this conveyor belt 15 in the direction of the arrow 16 past the output device 5, wherein the output device 5 in each case applies an adhesive bead 17 to the respective substrate 3. To guarantee a clean application of adhesive to the substrate 3, it is useful to interrupt the output of adhesive by means of the output device 5 from time to time, in particular at times at which no substrate 3 is arranged below the output device 5.

Figure 5:
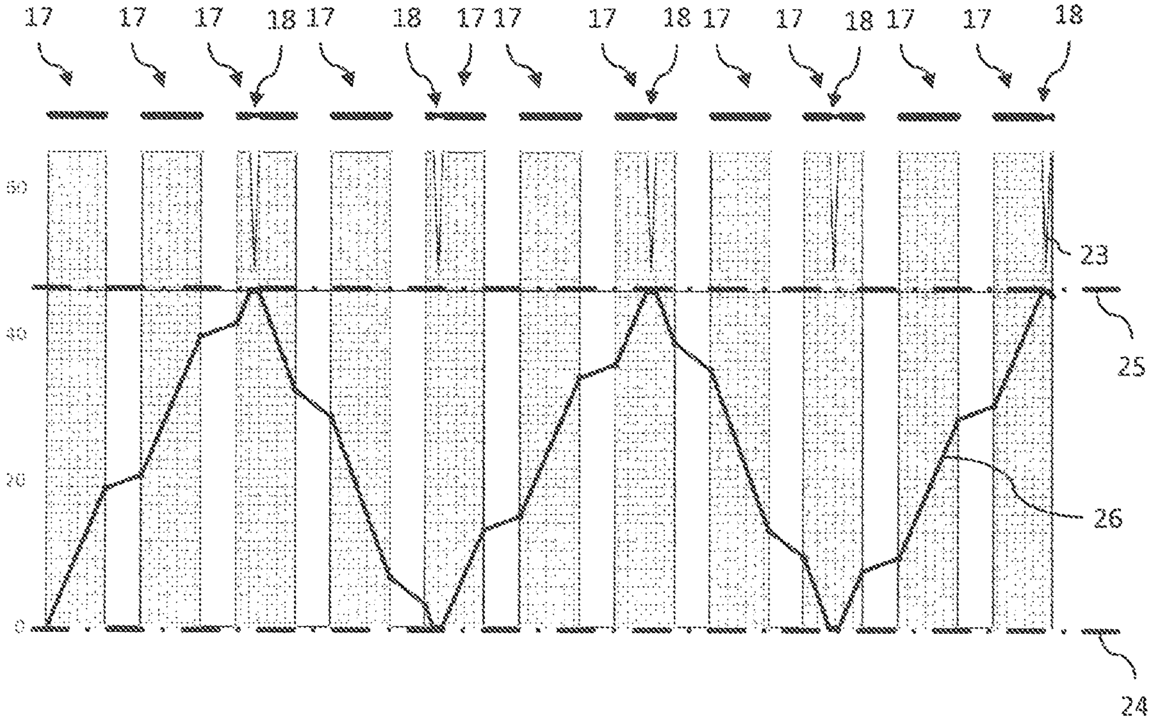
FIG. 5 is a diagram to illustrate a temporal development of a piston position of a piston pump, an output quantity of the fluid medium per time unit and a schematic illustration of the resulting application bead, of a piston pump or a method for operating the piston pump in which a reversal of the movement direction of the piston takes place exclusively at fixed reversal points.
Figure 6:
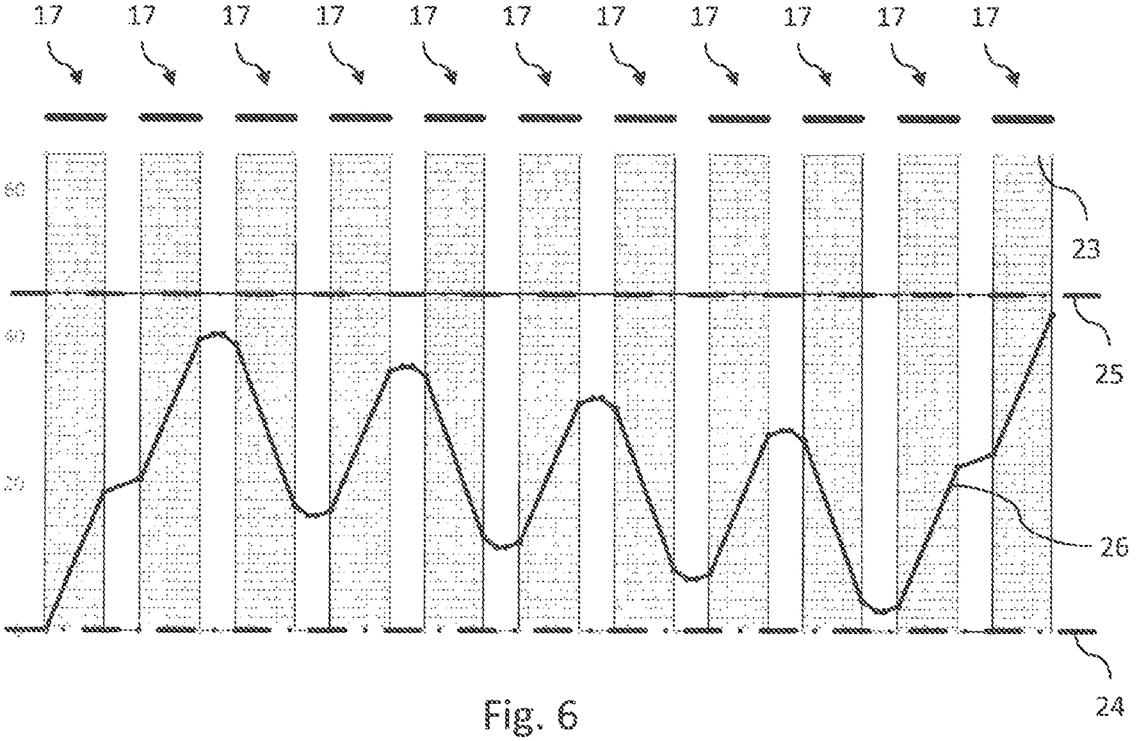
FIG. 6 is a diagram to illustrate the temporal development of the piston position, the output quantity of the fluid medium per time unit and a schematic illustration of the resulting application bead, in a piston pump according to the invention or with a method according to the invention for operating a piston pump.

The piston 4 of the piston pump 1 is movable between a first reversal point 24 and a second reversal point 25 (see FIG. 5 and FIG. 6). The movement direction of the piston 4 is reversed on reaching the respective reversal point 24, 25. On a reversal of the movement direction of the piston 4, there is a temporally limited fall in the pressure of the delivered adhesive. If adhesive is output by means of the output device 5 during this limited period, this pressure fall has a negative effect on the output quantity of the adhesive and hence a negative effect on the so-called application pattern. During the changeover process of the piston pump 1 and hence during the fall in adhesive pressure, there is a significantly smaller application of adhesive than during a continuous movement of the piston 4 of the piston pump 1. A clear constriction 18 is then visible in the applied adhesive bead 17. The effects of the changeover processes of the piston pump 4 on the output quantity of adhesive per time unit 23 and on the adhesive pattern or adhesive bead 17, are evident from FIG. 5.

Usually, the movement direction of the piston 4 in a piston pump 1 or in the methods for operating a piston pump 1 as known from the prior art, changes always and exclusively at fixed positions, namely at the two fixed reversal points 24, 25 which typically coincide with the dead centers of the piston pump 1: after a complete stroke of the piston 4, the changeover process is initiated and then a complete stroke is carried out in the opposite direction as far as the respective other reversal point of the reversal points 24, 25. Usually, activation of the changeover process and hence the reversal of the movement direction of the piston 4 takes place purely mechanically or by actuation of an electrical or electronic switch. There is no temporal coordination of the process of changing the movement direction of the piston 4 of the piston pump 1 with the output periods and interruption periods of the adhesive application.

In the exemplary embodiment according to the invention as shown in FIG. 6, it is provided that the movement direction of the piston 4 is reversed exclusively during the interruption periods. The temporal development of the piston position 26 and the output quantity of the adhesive per time unit 23 are depicted schematically in FIG. 6. It is clear from a comparison of FIG. 5 and FIG. 6 that, in FIG. 6, there is no fall in output quantity of adhesive per time unit 23 during the output periods, since the movement direction of the piston 4 is reversed exclusively during the interruption periods. Accordingly, the adhesive beads 17 shown in FIG. 6, in contrast to the adhesive beads 17 shown in FIG. 5, have no constrictions 18.

As also evident from FIG. 6, on a reversal of the movement direction, the piston 4 is each time at an intermediate position between the first reversal point 24 and the second reversal point 25, wherein the intermediate positions are different.

As also evident in FIG. 6, an output quantity of the adhesive output by means of the output device 5 during the respective output period is smaller than a delivery quantity of the medium delivered to the output device 5 by means of the piston pump 1 on a piston stroke of the piston 4 from the one reversal point 24, 25 to the other reversal point 24, 25.

The piston pump 1 shown in FIGS. 1 to 4 is a piston pump 1 which has leakages with respect to the adhesive to be delivered, so that during the interruption periods, a piston speed of the piston 4 is reduced in comparison with a piston speed during the output periods. This is also evident from the temporal development of the piston position 26 of the piston 4, as shown in FIG. 5 and FIG. 6. The leakage is achieved in that the piston 4 is not designed to seal with respect to a cylinder bore 12, wherein the cylinder bore 12 is made in a housing 19 of the piston pump 1.

The piston pump 1 has an upper pneumatic part with a pneumatic piston 20 for its drive. The pneumatic piston 20 is fixedly connected to a piston rod 6 which is in turn connected to the piston 4 serving for delivery of the adhesive. In the pneumatic region of the piston pump 1, furthermore a ring magnet 9 is connected to the pneumatic piston 20 and hence to the piston rod 6. Furthermore, an electronic printed circuit board 21 is arranged next to the pneumatic piston 20 or ring magnet 9, wherein three Hall sensors 10 are connected to the electronic printed circuit board 21. The Hall sensors 10 are configured such that they measure the magnetic flux density in the horizontal direction. On a travel of the pneumatic piston 20 or piston 4, which are connected together by means of the piston rod 6, the ring magnet 9 moves correspondingly to the movement of the piston rod 6, so because of the change in position of the ring magnet 9, the magnetic flux density detected by the respective Hall sensor 10 also changes. By means of the output signals from the Hall sensors 10, the piston position 26 and the piston speed can thus be determined. Furthermore, the movement direction of the piston 4 or pneumatic piston 20 can also be determined.

In principle, the piston position 26, the piston speed and also the movement direction of the piston 4 can be determined by means of a single Hall sensor 10. Preferably however, at least three Hall sensors 10 are used, since this firstly increases the accuracy and secondly raises the redundancy level, thus increasing the security against failure and the function and operating reliability of the piston pump 1.

Outside the pneumatic part of the piston pump 1, i.e. in the adhesive delivery region of the piston pump 1, this has a widening in the region of the end of the piston rod 6 facing away from the pneumatic piston 20, forming the double-action piston 4.

The piston 4 has an axial passage, in the region of which a check valve 7 with associated valve seat is arranged. The piston 4 is guided without sealing in the cylinder bore 12 formed on the housing 19. A second check valve 8 is formed in the cylinder bore 12. The check valve 8 is assigned to the intake chamber 13, so that adhesive from the intake chamber 13 can enter the adhesive delivery chamber of the piston pump 1 when the check valve 8 is in a defined position. If the check valve 7 is in a defined position, adhesive can be delivered to the pressure port 14 and from there reach the output device 5 via the heating hose 11.

A dynamic seal 22 without differential pressure is provided between the pneumatic part and the adhesive delivery part of the piston pump 1.

On a travel of the piston rod 6 from the first reversal point 24 in the direction of the second reversal point 25, at the same time adhesive is delivered to the output device 5 and adhesive is drawn in to the intake chamber 13 from the storage container (not shown). Leakage losses occur between the piston rod 6 and the housing 19, and between the piston 4 and the housing 19. On travel of the piston rod 6 in the opposite direction, i.e. on movement of the piston rod 6 from the second reversal point 25 in the direction of the first reversal point 24, no adhesive is drawn in but adhesive is merely delivered to the output device 5.

The piston pump 1 furthermore has a control device for controlling the movement direction of the piston 4, wherein the control device is configured to reverse the movement direction of the piston 4 on reaching the first reversal point 24 and the second reversal point 25. The piston pump 1 furthermore has a measuring device for measuring the piston speed, wherein the control device is configured to reverse the movement direction of the piston 4 if the measured piston speed is less than a specific speed value. Furthermore, the piston pump 1 has a measuring device for measuring a distance of the piston position 26 of the piston 4 from the reversal point lying in the movement direction of the piston 4. The Hall sensors 10 here form constituents of the measuring device for measuring the piston speed, the piston position 26, the distance and the movement direction of the piston 4. The control device is configured to reverse the movement direction of the piston 4 if the measured piston speed is less than a specific speed value, and the measured distance is less than a specific distance value. Such a design of the piston pump 1 has the advantage that the process of changing the movement direction of the piston 4 may take place solely from knowledge of the internal measurement data or measurement values of the piston pump 1. It is therefore not necessary to detect data on the state of the output device 5 and transmit this to the control device of the piston pump 1. The piston pump 1 may thus be used completely independently of the actual output device 5 used, and execute the method described above. Thus the piston pump 1 can be used universally. In particular, existing application systems 2 may be upgraded by replacement of the piston pump 1, so that these application systems 2 can execute the method described above.

That which is claimed is:

1. A double-action piston pump for delivering a fluid medium to an output device, wherein the piston pump has a piston which is movable between a first reversal point and a second reversal point for delivering the fluid medium, wherein the piston pump has a control device for controlling a movement direction of the piston, wherein the control device is configured to reverse the movement direction of the piston on reaching the first reversal point and the second reversal point, wherein the piston pump has a measuring device for measuring a piston speed, wherein the control device is configured to reverse the movement direction of the piston if the measured piston speed is less than a specific speed value.

2. The double-action piston pump as claimed in claim 1, wherein the piston pump has leakages with respect to the fluid medium to be delivered, preferably the piston is not designed to seal with respect to a cylinder, and/or the piston pump has a piston rod which is not sealed with respect to a guide.

3. The double-action piston pump as claimed in claim 1, wherein the piston pump has two check valves, wherein depending on the movement direction of the piston, one check valve of the two check valves is open and the other check valve of the two check valves is closed.

4. The double-action piston pump as claimed in claim 1, wherein the piston pump has a measuring device for measuring a distance of the piston position of the piston from the first reversal point or the second reversal point lying in the movement direction of the piston, wherein the control device is configured to reverse the movement direction of the piston if the measured piston speed is less than a specific speed value and the measured distance is less than a specific distance value.

5. The double-acting piston pump as claimed in claim 1, wherein the piston pump has a measuring device for measuring a distance of the piston position of the piston from the first reversal point or the second reversal point lying opposite the movement direction of the piston, wherein the control device is configured to reverse the movement direction of the piston if the measured piston speed is less than a specific speed value and the measured distance exceeds a specific distance value.

6. The double-action piston pump as claimed in claim 4, wherein the piston pump has at least one magnet, wherein the at least one magnet is movable together with the piston, wherein the measuring device for measuring the piston speed comprises at least one Hall sensor and/or the measuring device for measuring the distance of the piston position of the piston from the first reversal point or the second reversal point lying in the movement direction of the piston comprises at least one Hall sensor, and/or the measuring device for measuring the distance of the piston position of the piston from the first reversal point or the second reversal point lying opposite the movement direction of the piston comprises at least one Hall sensor.

7. The double-action piston pump as claimed in claim 6, wherein the piston pump comprises at least two Hall sensors, wherein a travel length of the piston from the first reversal point to the second reversal point or from the second reversal point to the first reversal point with respect to measurement of the piston speed and/or measurement of the piston position is divided into at least two portions, wherein one of the at least two Hall sensors is assigned to each portion.

8. The double-action piston pump as claimed in claim 1, wherein the piston pump is configured as a pneumatically driveable piston pump, wherein the control device has an actuatable valve or an actuatable valve arrangement, and wherein on actuation of the actuatable valve or actuatable valve arrangement, a direction of the pressurization of a pneumatic piston of the piston pump that is actively connected to the piston of the piston pump is changed.

9. An application system for application of a fluid medium, to a substrate, having a double-action piston pump as claimed in claim 1 and an output device for intermittent output of the fluid medium which is delivered by means of the double-action piston pump to the output device.

* * * * *